Dec. 27, 1949     J. C. SMITH     2,492,330
CUTTING MACHINE
Filed March 5, 1948
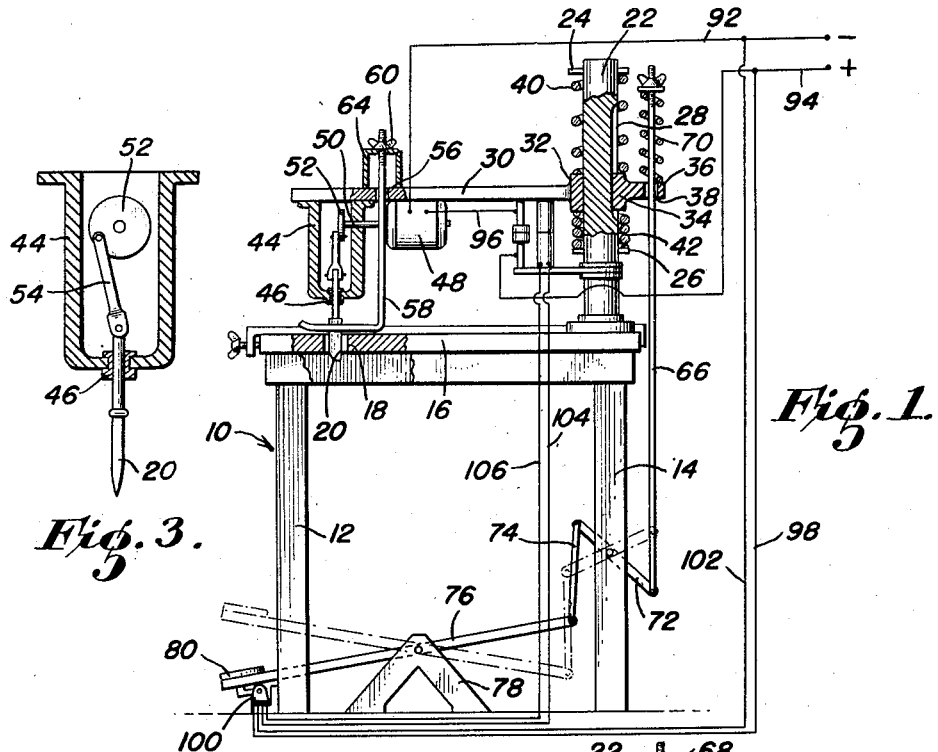
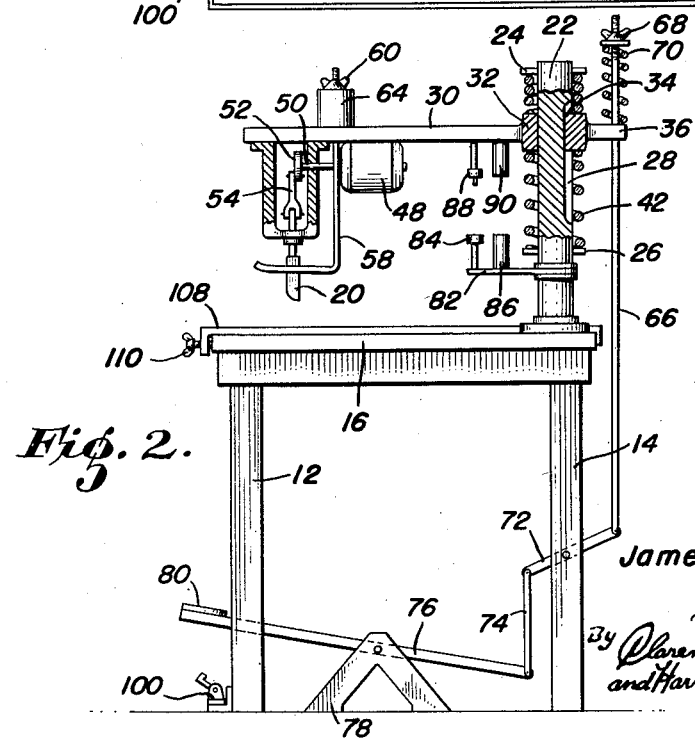
James C. Smith
Inventor:

Patented Dec. 27, 1949

2,492,330

UNITED STATES PATENT OFFICE 2,492,330

CUTTING MACHINE

James C. Smith, Lumberton, N. C.

Application March 5, 1948, Serial No. 13,317

1 Claim. (Cl. 164—47)

This invention relates to a cutting machine primarily used for cutting leather, cardboard, paper, cloth, and similar materials.

The primary object of this invention is the provision of a cutting machine having a power operated reciprocating cutting blade which blade may be adjustably raised and kept out of the way of the operator before or after the material is actually cut.

A second object of this invention is the provision of a cutting machine having a power operated reciprocating cutting blade carried by a slidably and resiliently mounted support which support can be readily, easily, and adjustably raised and lowered as desired. The raising and lowering mechanism may preferably be a foot actuated lever which is in operative engagement with a switch connected to the electric power source that actuates the motor. Thus the foot lever serves a dual function of raising and lowering the cutting knife and also tripping the switch so that the motor is automatically turned on and the cutting blade reciprocated.

Another object of this invention is the provision of a cutting machine having a power operated reciprocating cutting blade and a pair of safety devices in the form of a male and female plug and a split magnet which are automatically separated as the blade is raised from the work table, as a consequence of which the blades stop reciprocating so that it is not in cutting motion when the material is not being cut. Thus there is no danger of the operator being harmed as soon as he has stopped cutting the material and has raised the cutting blade from the work table itself.

These, together with various ancillary objects and features of the invention which will later become apparent as the following description proceeds, are attained by the device, a preferred embodiment of which has been illustrated by way of example in the accompanying drawings, wherein:

Figure 1 is a side elevational view of the cutting machine, parts being shown in section, showing the cutter in a lowered operative position;

Figure 2 is a side elevational view similar to Figure 1, parts being shown in section, showing the cutter in a raised non-working position; and Figure 3 is an enlarged sectional detail of construction, illustrating particularly the cutter and a portion of the means for actuating the cutter.

Specific reference is now made to the drawings. In the several views in the accompanying drawings and in the following specification similar reference characters indicate corresponding elements throughout.

Generally indicated at 10 is a work table having leg supports 12 and 14 and a work top 16 supported thereon in which is provided an aperture 18 of suitable size and shape, preferably rectangular, through which a suitable cutter blade 20 reciprocates.

Suitably secured to the work top 16 at the end opposite the aperture 18 is an upright 22 which is preferably cylindrical, and to the extremities of which is secured an upper stop 24 and a lower stop 26. The upright 22 is further provided with a longitudinal slot or keyway 28.

Slidably secured to the upright 22 is a support 30 which is provided with an integral sleeve 32 journaled about the upright 22 having an integral inwardly extending key 34 which frictionally engages the keyway 28 to secure the support 30 against rotation. Integral with the key 34 is an extension or ear 36 having a vertical aperture 38 therein.

Interposed between the upper stop 24 and the upper surface of the support 30 is a spring 40 which is somewhat weaker than another spring 42 interposed between the lower stop 26 and the under surface of the support 30.

At the extremity opposite the upright 22 and depending from the under surface of the support 30 is a yoke 44, the web portion of which is provided with an aperture about which is supported a bearing 46. Adjacent the yoke and mounted to the underside of the support 30 is a motor 48 which operatively engages the drive shaft 50 which is journalled through a suitable aperture in the yoke 44 and to which is secured a wheel 52. Eccentrically mounted on the wheel 52 is a pitman 54 which in turn is secured at its other extremity to the cutter 20 which passes through the bearing 46 in the yoke.

Interposed between the yoke 44 and the motor 48 is an aperture 56 through which is journalled a foot 58 provided with an aperture which is normally in alignment with the aperture 18 of the work top. The upper end of the foot 58 is screw threaded to receive a wing nut 60. Interposed between the wing nut 60 and the support 30 around the pressure foot 58 is a housing 64. Thus by turning the wing nut 60 the height of the pressure foot 58 above the work top 16 may be readily adjusted to suit the thickness of any material being cut.

Journalled through the aperture 38 is a rod which is screw threaded at its upper extremity to receive a wing nut 68. Interposed between the wing nut 68 and the ear 36 is a spring 70. The bottom extremity of the rod 66 is pivotally secured to a link 72 which is in turn pivoted substantially at its center to the leg 14. The link 72 is in turn pivoted to another link 74 which is in turn pivoted to a foot pedal 76 which is in turn pivoted to a fulcrum 78 provided beneath the work table. Secured to the free end of the foot pedal 76 is a suitable foot pad 80.

Suitably secured to the upright 22 is a lateral arm 82 to which is secured a female plug 84 and a magnet 86. Depending from the under surface of the support 30 is a male plug 88 in vertical alignment with the female plug 84 and a magnet armature 90 also in vertical alignment with the magnet 86.

A line 92 attached to the negative pole of an electric source (not shown) runs to the motor 48. Another line 94 attached to the positive pole of the electric source runs to the female plug 84. The motor 48 is electrically connected to the male plug 88 by means of a conductive line 96. A line 98 is operatively connected to and runs from the line 94 to a switch 100 secured to the leg 12 beneath the foot pad 80. Another line 102 operatively connects the line 92 with the switch 100. A pair of lines 104 and 106 respectively operatively connect the magnet 86 to the switch 100.

A guide member 108 is also provided which slidably and adjustably mounts the work top 16 by means of a wing clamp 110 which serves as a marginal guide for material which can be cut into strips of any desired width.

In practical operation, the operator depresses the foot pad 80 which in turn actuates the rod 66 and pulls the support 30 and the associated reciprocating cutter 20 down through the aperture 18 in the work top 16. At the same time the switch 100 is flipped, the circuit is closed, the male and female plugs 84 and 88 contact, the magnets 86 and 90 also contact, the motor is started and the cutter blade 20 begins to reciprocate. The contracted spring 42 urges the support 30 upwardly. However, the magnets 86 and 90 keep the support 30 in a lowered position against the tension of the spring 42. When the switch 100 is flipped again so that the circuit is broken, the magnets are de-activated and the support 30 is raised by the spring 42 contracting spring 40 which is weaker than spring 42. Should, however, the support 30 be raised accidentally even though the switch 100 has not been flipped, the male and female plugs would spread apart, break the circuit, and immediately stop the motor, so that in any case, when the cutting blade is in raised position it will never be reciprocating.

In view of the foregoing description taken in conjunction with the accompanying drawings, it is believed that a clear understanding of the device will be quite apparent to those skilled in this art. A more detailed description is accordingly deemed unnecessary.

It is to be understood, however, even though there is herein shown and described, a preferred embodiment of the invention the same is susceptible to certain changes fully comprehended by the spirit of the invention as herein described and the scope of the appended claim.

Having described the invention, what is claimed as new is:

A cutting machine comprising an elevated work top having an aperture therein, an upright carried by said work top, a support slidably mounted on said upright, an upper and a lower stop carried by said upright, a first spring interposed between the upper stop and the support, a second spring interposed between the lower stop and the support, a motor mounted on said support having a drive shaft, a driven wheel carried by said drive shaft, a cutter, a pitman connected at one end to said cutter and at the other end eccentrically mounted on said wheel, conductive wires operatively connected to said motor and to an electric source, a first switch carried by said support and operatively connected to said conductive wires, a rod adjustably secured to said support, a second switch, conductive wires connecting said second switch to an electric source, and lever means connected to said rod for simultaneously raising and lowering said support and actuating both of said switches.

JAMES C. SMITH.

REFERENCES CITED

The following references are of record in the file of this patent:

UNITED STATES PATENTS

| Number | Name | Date |
|---|---|---|
| 1,274,196 | Reed | July 30, 1918 |
| 1,459,320 | Corset | June 19, 1923 |
| 1,692,454 | Levy | Nov. 20, 1928 |
| 1,858,033 | Brackett | May 10, 1932 |
| 1,907,751 | Dickinson | May 9, 1933 |
| 2,207,887 | Johnston | July 16, 1940 |
| 2,387,411 | Schmidt | Oct. 23, 1945 |

FOREIGN PATENTS

| Number | Country | Date |
|---|---|---|
| 520,244 | Germany | Mar. 9, 1931 |